(12) United States Patent
Chou et al.

(10) Patent No.: US 9,268,408 B2
(45) Date of Patent: Feb. 23, 2016

(54) OPERATING AREA DETERMINATION METHOD AND SYSTEM

(71) Applicant: Wistron Corporation, New Taipei (TW)

(72) Inventors: Chia-Te Chou, New Taipei (TW); Shou-Te Wei, New Taipei (TW); Hsun-Chih Tsao, New Taipei (TW); Chih-Hsuan Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 158 days.

(21) Appl. No.: 13/771,094

(22) Filed: Feb. 20, 2013

(65) Prior Publication Data

US 2013/0321404 A1 Dec. 5, 2013

(30) Foreign Application Priority Data

Jun. 5, 2012 (TW) .............................. 101120162 A

(51) Int. Cl.
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
None
See application file for complete search history.

(56) References Cited

U.S. PATENT DOCUMENTS

| 7,760,248 | B2* | 7/2010 | Marks et al. ................ 348/231.4 |
| 2009/0262187 | A1* | 10/2009 | Asada et al. ..................... 348/77 |
| 2012/0092300 | A1* | 4/2012 | Wang et al. ................... 345/175 |
| 2012/0309517 | A1* | 12/2012 | Al-Ghosien et al. ............ 463/31 |
| 2012/0326995 | A1* | 12/2012 | Zhang et al. .................. 345/173 |
| 2013/0321271 | A1* | 12/2013 | Bychkov et al. .............. 345/158 |

FOREIGN PATENT DOCUMENTS

| TW | 201218041 | 5/2012 |
| TW | M428457 | 5/2012 |
| WO | 2008142478 | 11/2008 |

OTHER PUBLICATIONS

"Office Action of Taiwan Counterpart Application", issued on Sep. 11, 2014, p. 1-p. 17, with English translation.

* cited by examiner

*Primary Examiner* — Phi Hoang
*Assistant Examiner* — Diane Wills
(74) *Attorney, Agent, or Firm* — Jianq Chyun IP Office

(57) ABSTRACT

An operating area determination method and system are provided. In the operating area determination method, a plurality of depth maps of a target scene is generated at several time points. At least two specific depth maps among the depth maps are selected and compared to identify a moving object in the target scene, and a position of the moving object in the target scene is defined as a reference point. A standard point in the target scene is obtained according to the reference point and a specific depth corresponding to the reference point. An effective operating area in the target scene is determined according to the reference point and the standard point for controlling an electronic apparatus.

12 Claims, 4 Drawing Sheets

OPERATING AREA DETERMINATION METHOD AND SYSTEM

CROSS-REFERENCE TO RELATED APPLICATION

This application claims the priority benefit of Taiwan application serial no. 101120162, filed on Jun. 5, 2012. The entirety of the above-mentioned patent application is hereby incorporated by reference herein and made a part of this specification.

BACKGROUND OF THE INVENTION

1. Field of the Invention

The present invention is directed to a method and a system of identifying an operator and more particularly, to a method and a system of identifying an operator in a target scene and determining an effective operating area.

2. Description of Related Art

With the progress of the display technique, a display is no longer limited to presenting 2-dimensional (2D) images only. More and more display products supporting 3-dimensional (3D) images have been launched to the market and provide users with diversified video and audio experiences. In addition, a remote controller is no longer the only apparatus used to control the display product. As long as a motion-sensing system is equipped with the display product, a user's gesture or body movement can be used to control the display product to react. Among products in support of the aforementioned technique, a Smart TV is one of the most popular products and gradually plays an important role in the market.

Taking the Smart TV equipped with a motion-sensing system for example, during operation, the motion-sensing system is required to search out a person as the operator from the whole background according to face feature information stored in a database first, and then, sense the motion of the operator so as to control the Smart TV. However, when there are more than two people in the background, a general type motion-sensing system cannot effectively determine which one the actual operator is.

Accordingly, in many types of Smart TVs launched to the market, the operator is selected according to a distance of the person. For example, the person has the closer distance to the Smart TV is defined as the operator. However, the method of defining the operator by distance easily results in inaccuracy. For example, when a passer passes from the front of the actual operator, the system operation is interfered and an undesired operation result occurs since the passer is closer to the Smart TV than the operator. As for the method of defining every person as the operator, it will result in overly high system requirements since the operation of follow-up tracking the user's motion is significantly complicated. Accordingly, how to effectively determine the operator is the technique that the persons in this industry devote to develop.

SUMMARY OF THE INVENTION

The present invention is directed to an operating area determination method and system capable of accurately identifying a main operator in a target scene.

The present invention is directed to an operating area determination method including steps as follows. A plurality of depth maps of a target scene is generated at several time points. A difference between at least two specific depth maps is compared to identify a moving object in the target scene. A position of the moving object in the target scene is defined as a reference point. According to the reference point and a specific depth corresponding to the reference point, a standard point in the target scene is obtained. An effective operating area in the target scene is determined according to the reference point and the standard point for controlling an electronic apparatus.

In an embodiment of the present invention, the step of generating the depth maps of the target scene at the several time points includes capturing at least one image of the target scene for each of the several time points through at least one image capture device and analyzing a distance between at least one object in the at least one image and an observing position respectively to generate the depth map of the target scene at the time point.

In an embodiment of the present invention, the step of comparing the difference of the at least two specific depth maps among the depth maps to identify the moving object in the target scene includes performing a detection of a motion feature on the at least two specific depth maps to identify the moving object which moves and matches a predetermined operation object type.

In an embodiment of the present invention, the operation object type is a user's hand, a remoter controller or a baton.

In an embodiment of the present invention, the step of obtaining the standard point in the target scene according to the reference point and the specific depth corresponding to the reference point includes obtaining one of the specific depth maps, searching outward for a standard object in the obtained specific depth map using the reference point as a center, wherein a difference between a depth corresponding to the standard object and the specific depth is not exceeding a preset value and defining a position of the standard object in the target scene as the standard point.

In an embodiment of the present invention, the step of searching outward for the standard object in the obtained specific depth map using the reference point as the center includes searching for the standard object toward a specific direction using the reference point as the center.

In an embodiment of the present invention, the standard object is a user's face.

In an embodiment of the present invention, after the step of determining the effective operating area according to the reference point and the standard point, the method further includes the step of corresponding the effective operating area with a display screen of the electronic apparatus.

The present invention is directed to an operating area determination system including at least one image capture device, a depth unit and a processing unit. The depth unit is coupled to the at least one image capture device and configured to generate a plurality of depth maps of a target scene according to a capture result provided by the at least one image capture device, wherein each of the depth maps corresponds to a time point. The processing unit is coupled to the depth unit and configured to compare a difference between at least two specific depth maps among the depth maps to identify a moving object in the target scene, define a position of the moving object in the target scene as a reference point, obtain a standard point in the target scene according to the reference point and a specific depth corresponding to the reference point and determine an effective operating area for controlling an electronic apparatus in the target scene according to the reference point and the standard point.

In an embodiment of the present invention, wherein at each time point, the depth unit obtains at least one image of the target scene captured by the at least one image capture device and analyzes a distance between at least one object in the image and an observing position respectively to generate the depth map of the target scene at the time point.

In an embodiment of the present invention, the processing unit performs a detection of a motion feature on the at least two specific depth maps to identify the moving object which moves and matches a predetermined operation object type.

In an embodiment of the present invention, the operation object type is a user's hand, a remoter controller or a baton.

In an embodiment of the present invention, the processing unit obtains one of the specific depth maps, searches outward for a standard object in the obtained specific depth map using the reference point as a center, wherein a difference between a depth corresponding to the standard object and the specific depth is not exceeding a preset value and defines a position of the standard object in the target scene as the standard point.

In an embodiment of the present invention, the processing unit searches for the standard object toward a specific direction using the reference point as the center.

In an embodiment of the present invention, the standard object is a user's face.

In an embodiment of the present invention, the processing unit corresponds the effective operating area with a display screen of the electronic apparatus.

To sum up, by generating the depth maps of the target scene at different time points, the moving object in the target scene can be identified as the reference point from two specific depth maps among the depth maps. The standard point is obtained according to the reference point so that the effective operating area in the target scene is defined according to the reference point and the standard point. Thus, even though there is a plurality of users existing in the target scene, the operating area determination method and system can also identify which user is performing the control operation so as to determine the effective operating area. In follow-up, the operating motion of the user is identified and traced only based on the effective operating area, such that the operation performance can be significantly increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

With the increasing function types supported by an electronic apparatus, the efficiency of accurately identifying control behaviors of a user would be improved if a user mainly performing a control operation in a target scene can be identified to define an operating area so that the operating area can correspond to a display screen of an electronic apparatus. An operating area determination method and system is provided by the present invention in view of the foregoing. In order to make the present invention comprehensible, embodiments of implementing the present invention will be exemplary described hereinafter.

Figure 1:
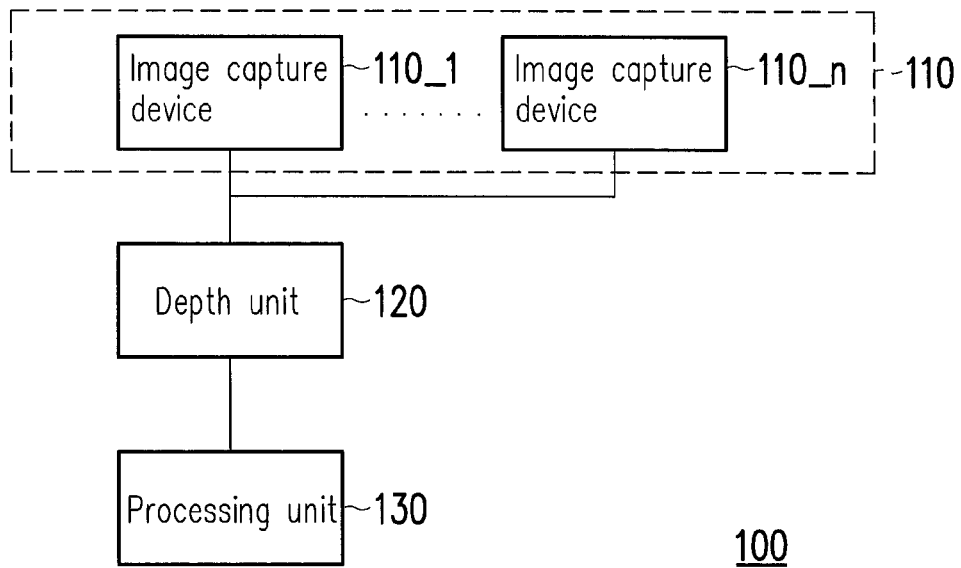
FIG. 1 is a block diagram illustrating an operating area determination system according to an embodiment of the present invention.

FIG. 1 is a block diagram illustrating an operating area determination system according to an embodiment of the present invention. Referring to FIG. 1, an operating area determination system 100 includes n image capture devices (i.e. image capture devices 110_1 through 110_n, where n is a positive integer), a depth unit 120 and a processing unit 130. The depth unit 120 is coupled to the image capture devices 110_1 through 110_n and the processing unit 130, respectively. A function of each component in the operating area determination system 100 will be described hereinafter.

The image capture devices 110_1 through 110_n are configured to capture a target scene to obtain images of the target scene. The image capture is, for example, performed periodically or according to a control of the operating area determination system 100. Each image capture device may be a video camera or a camera adopting a charge coupled device (CCD) lens, a complementary metal oxide semiconductor transistors (CMOS) lens or an infrared lens, but the present invention is not limited thereto. It should be mentioned that the present invention is not intent to limit the value of n. When n is more than 1 (e.g. n is 2), the image capture devices 110_1 through 110_n may form a camera array. Namely, the image capture devices 110_1 through 110_n is arranged in parallel without any vertical displacement, and a distance between the devices accords with a distance between human eyes. When n is equal to 1, the image capture device 110_1 is, for example, a depth video camera. The image capture devices 110_1 through 110_n may transmits a captured image to the depth unit 120 for a sequential image process by a wired or a wireless method. For descriptive convenience, the image capture devices 110_1 through 110_n are collectively referred to as an image capture apparatus 110.

The depth unit 120 is configured to generate a plurality of depth maps of the target scene according to a capture result provided by the image capture apparatus 110. Each of the depth maps corresponds to a time point. In detail, the depth maps represent different depths by different gray-scale values. For example, for a first object located closer to the image capture apparatus 110, the depth unit 120 determines that the first object has a lower depth value, while for a second object located farther from the image capture apparatus 110, the depth unit 120 determines that the second object has a higher depth value. In the present embodiment, the object having the lower depth value is represented in the depth maps by the higher gray-scale value while the object having the higher depth value is represented in the depth maps by the lower gray-scale value. That is, the farther from the image capture apparatus 110 the object is, the closer to black color it is in the depth maps, while the closer to the image capture apparatus 110 the object is, the closer to white color the object is in the depth maps. However, the present invention is not intent to limit the corresponding relationship between the depth value and the gray-scale value. In other embodiments, the object with the higher depth value may also be represented by the higher gray-scale value in the depth map, and the object with the lower depth value may also be represented by the lower gray-scale value in the depth map, or otherwise, the object is presented in different colors according to the depth value gradient.

The processing unit 130 may be hardware having a processing capability (e.g. a chip set or a processor), a software component (e.g. an operation system or an application) or a combination thereof. The processing unit 130 is configured to determine an effective operating area in the target scene according to the depth maps generated by the depth unit 120. Furthermore, the operating area determination system 100 of the present embodiment can be collectively operated with an electronic apparatus (e.g. a Smart TV, but the present invention is not limited thereto), which is, for example, integrated into the electronic apparatus, externally connected with the electronic apparatus via a special interface and a transmission wire, or communicated with the electronic apparatus by a wireless communication method. When there is a plurality of users in the target scene, only the motion made by the user located within the effective operating area will be considered as an instruction to operate the electronic apparatus.

Figure 2:
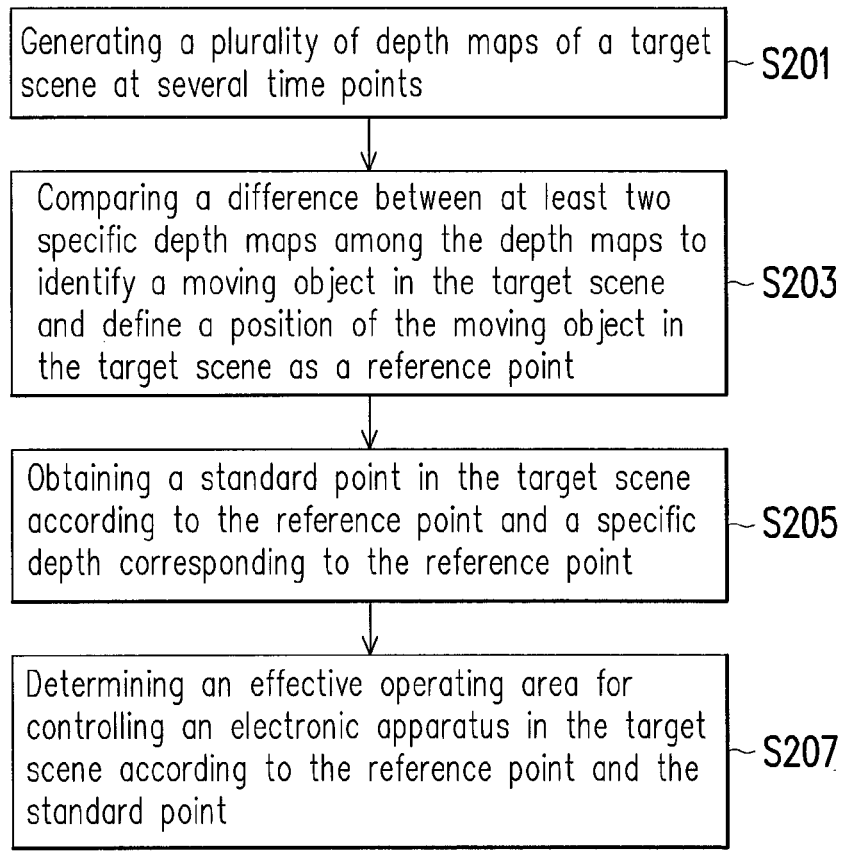
FIG. 2 is a flowchart illustrating an operating area determination method according to an embodiment of the present invention.
Figure 3A:
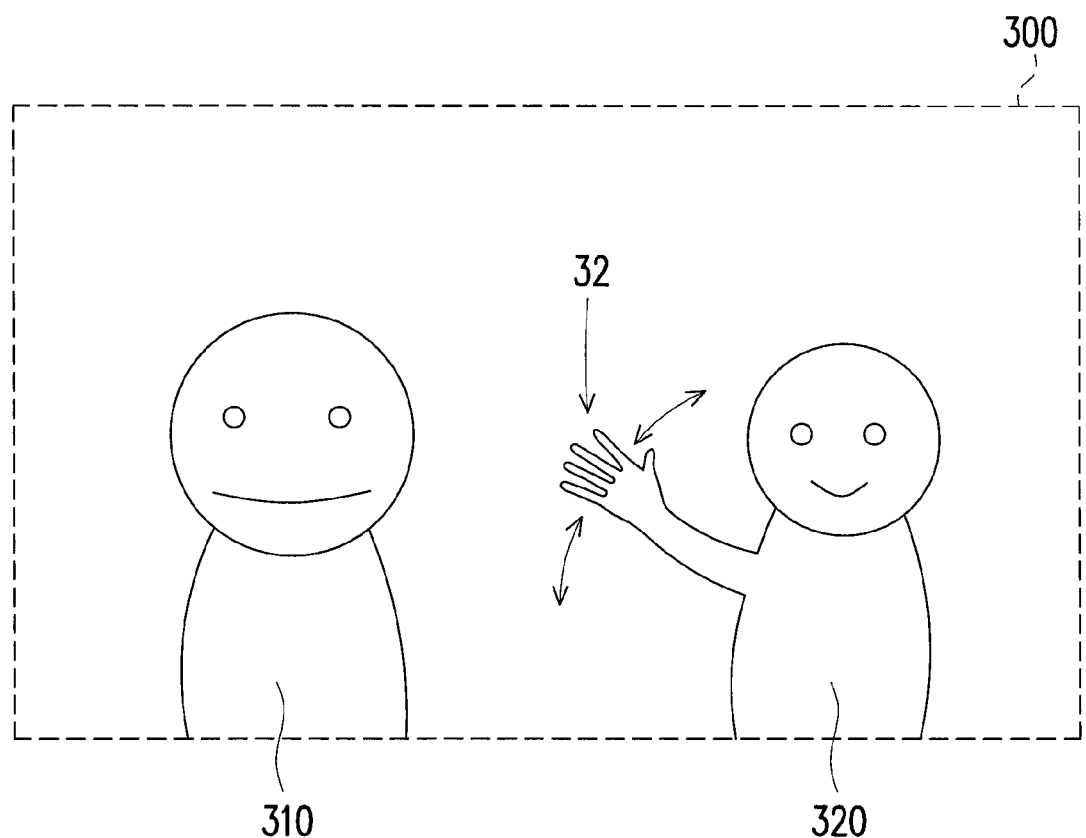
FIG. 3A is a schematic diagram illustrating a target scene according to an embodiment of the present invention.

Hereinafter, each step of an operating area determination method of the present embodiment will be described with reference to the operating area determination system 100. FIG. 2 is a flowchart illustrating an operating area determination method according to an embodiment of the present invention. FIG. 3A is a schematic diagram illustrating a target scene according to an embodiment of the present invention. It should be mentioned that though in the present embodiment, only two users 310 and 320 are in a target scene 300, but the present invention is not intent to limit a number and a type of the objects in the target scene 300. Besides, in the present embodiment, it is assumed that the user 320 waves his/her right hand 32 back and forth in the target scene 300.

Referring to FIG. 1 with FIG. 2 and FIG. 3A, first, as shown in step S201, the depth unit 120 generates a plurality of depth maps of the target scene 300 at several time points. In particular, to generate a depth map of the target scene 300 at a time point T, the depth unit 120 first obtains one or more images of the target scene 300 captured by the image capture apparatus 110 at the time point T and analyzes a distance between each object in the image and the image capture apparatus 110 so as to generate the depth maps.

For example, in a scenario where the image capture apparatus 110 includes only one image capture device 110_1 (e.g. a depth video camera), when the image capture image capture device 110_1 captures the target scene 300 at the time point T, depth message (i.e. a distance respectively between each of the users 310 and 320 and the image capture device 110_1) of the users 310 and 320 is obtained by applying the infrared reflection principle so that the depth unit 120 further generates the depth maps of the target scene 300 at the time point T. Besides, in a scenario where the image capture apparatus 110 includes multiple image capture devices (e.g. the image capture devices 110_1 and 110_2), the depth unit 120 also obtains images I_1 and I_2 by respectively capturing the target scene 300 using the image capture devices 110_1 and 110_2 at the time point T, analyzes a distance between each of the users 310 and 320 and an observing position (e.g. the position of each of the image capture devices 110_1, 110_2) according to the images I_1 and I_2 and generates the depth maps of the target scene 300 at the time point T.

Figure 3B:
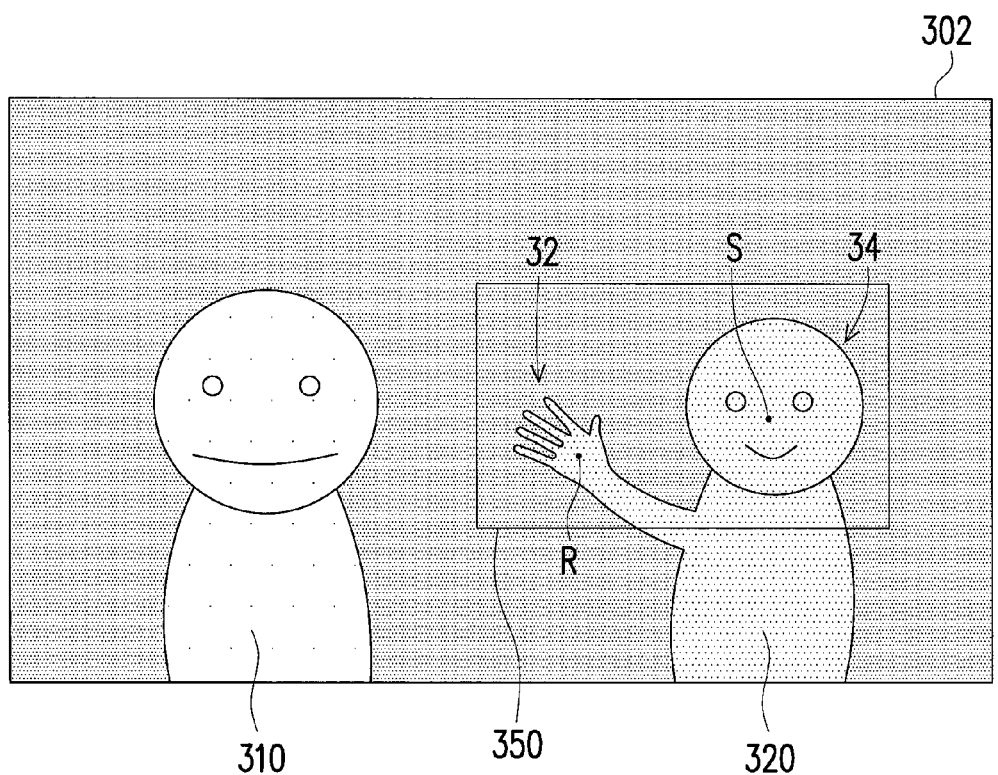
FIG. 3B a schematic diagram illustrating a specific depth map according to an embodiment of the present invention.

FIG. 3B a schematic diagram illustrating a specific depth map according to an embodiment of the present invention. Referring to FIG. 3B, in a depth map 302, since the user 310 is marked by a higher gray-scale value (closer to white color) while the user 320 is marked by a lower gray-scale value (closer to black color), it is determined according to the depth map 302 that the user 310 is closer to the image capture apparatus 110.

Next, as shown in step S203, the processing unit 130 obtains at least two specific depth maps from the multiple depth maps generated by the depth unit 120, compares a difference between the obtained specific depth maps to identify a moving object in the target scene 300 and defines a position of the moving object in the target scene 300 as a reference point. The time point corresponding to each of the specific depth maps may be adjacent to each other or away from each other by a predefined time period. Meanwhile, in the present embodiment, the moving object identified by the processing unit 130 has to match a predetermined operation object type, such as the user's hand, a remote controller or a baton.

In particular, if the number of the specific depth maps is 2, the processing unit 130 performs a detection of a motion feature on the two specific depth maps to identify the moving object which moves and matches the predetermined operation object type. Therein, the motion feature is associated with the predetermined operation object type. If the predetermined operation object type is the user's hand, then the motion feature may be a waving degree or a shape change of a hand gesture. For example, the processing unit 130 may compare the two specific depth maps in positions having the same or similar gray-scale value and an area in the similar shape. If the motion of the area between the two specific depth maps changes over a threshold, it indicates that the area includes an object that is moving. The processing unit 130 may test an original 2-dimensional (2D) image constructing the specific depth maps to determine whether the type of the object matches the predetermined operation object type. For example, if the user 320 waves his or her right hand left and right while the user 310 also shakes his or her head left and right, the processing unit 130 finds two moving objects. Accordingly, as long as the original 2D image is further obtained, and a procedure identifying the face feature or the hand feature is further performed thereon, the moving object matching the predetermined operation object type can be accurately found. In another embodiment, the depth unit 120 may first confirm the operation object type of each area when generating the depth maps, and then, when the processing unit 130 searches for the moving object, areas that does not match the predetermined operation object type may be directly precluded.

It should be noted that if two or more moving objects matching the predetermined object type is identified by the processing unit 130, the processing unit 130, for example, selects the moving object located closer to the image capture apparatus 110 to define the reference point and go on the follow-up steps.

Afterward, as shown in step S205, the processing unit 130 obtains a standard point in the target scene 300 according to the reference point and the specific depth corresponding to the reference point. For example, the processing unit 130 uses one of the specific depth maps obtained in step S203, e.g. the latest specific depth map, to obtain a position of the standard point. If the depth map 302 depicted in FIG. 3B is the latest specific depth map obtained by the processing unit 130, and by a method such as the motion feature detection, the processing unit 130 identifies that the moving object in the target scene 300 is the right hand 32 of the user 320 and uses the center of the right hand as a reference point R. Then, the processing unit 130 uses the reference point R as a center to search outward for a standard object. In the present embodiment, it is assumed that the standard object is the user's face 34, but the present invention is not limited thereto. However, it is to mention that the difference between the depth corresponding to the standard object and the specific depth corresponding to the right hand 32 is not exceeding a preset value. For example, if the preset value is 3 (but the present invention is not limited thereto), and a gray-scale value 30 represents the specific depth corresponding to the right hand 32, the depth corresponding to the standard object has to be within a rang from the gray-scale value of 27 to the gray-scale value of 33. When using the reference point R as the center, searching outward and finding an object having the depth matching the range (i.e. the user's face 34), the processing unit 130 uses the object as the standard object and defines the position of the standard object in the target scene as a standard point. For example, the processing unit 130 uses the center of the face 34 as a standard point S.

Since most users are used to operate by right hands, in order to improve the efficiency for finding the standard object, the processing unit 130 uses the reference point R as the center to search rightward for the face 34 of the user 320 in the specific depth map 302. In other embodiments, the processing unit 130 may also search for the standard object toward any other predefined specific direction according to the corresponding relationship of positions between the standard object and the moving object in the real environment.

Finally, as shown in step S207, the processing unit 130 uses the reference point R and the standard point S to determine an effective operating area 350 for controlling the electronic apparatus in the target scene 300. In an embodiment, an aspect ratio of the effective operating area 350 matches an aspect ratio of a screen of the electronic apparatus, and the effective operating area 350 covers the moving object and the standard object (i.e. the user's right hand 32 and face 34).

Figure 4:
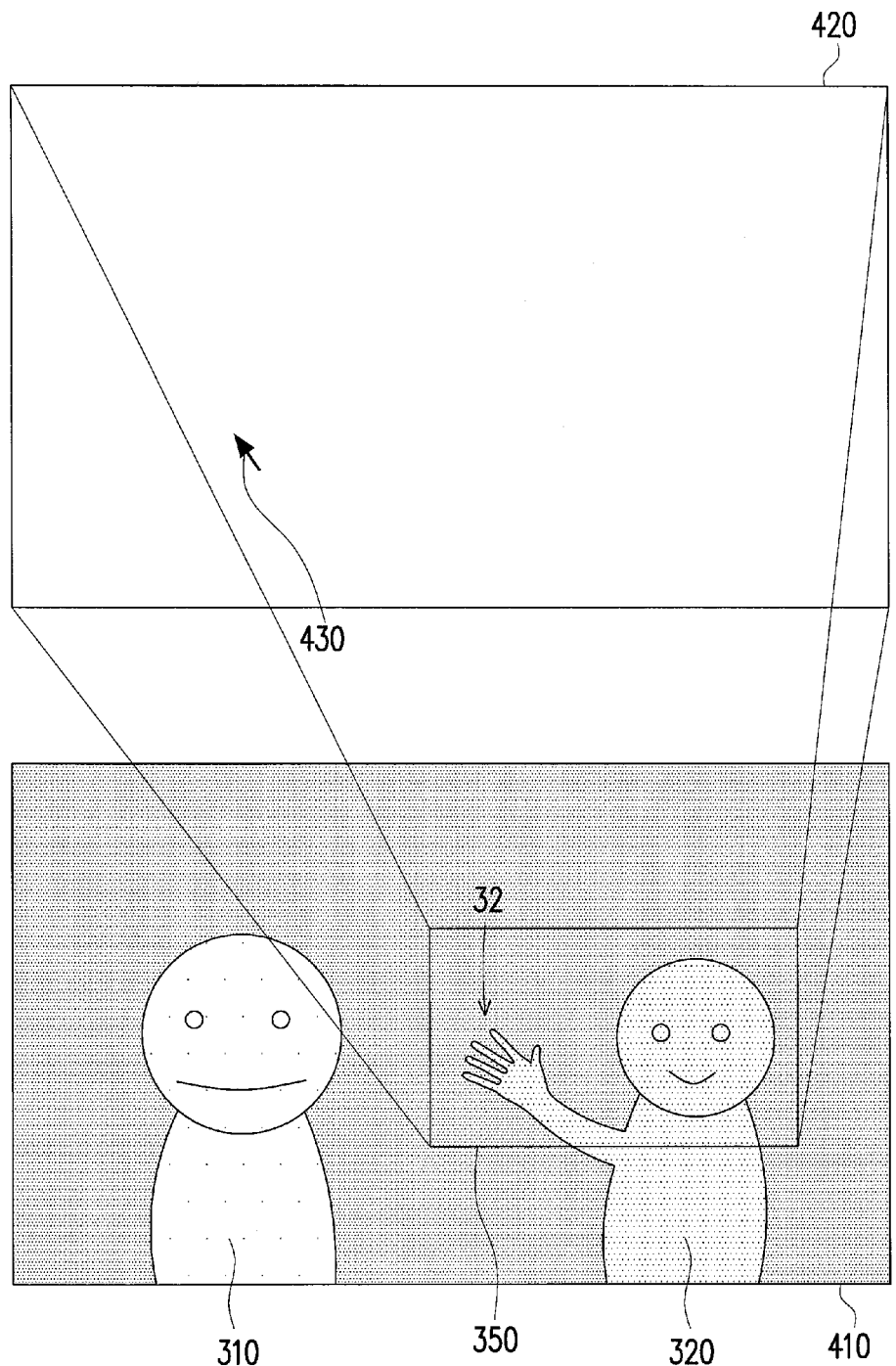
FIG. 4 is a schematic diagram illustrating an effective operating area and a display screen of an electronic apparatus corresponding to each other according to an embodiment of the present invention.

After the effective operating area 350 is determined, the effective operating area 350 and the display screen of the electronic apparatus correspond to each other by the processing unit 130, that is, each location of the effective operating area 350 corresponds to a respective location of the display screen. FIG. 4 is a schematic diagram illustrating an effective operating area and a display screen of an electronic apparatus corresponding to each other according to an embodiment of the present invention. Referring to FIG. 4, after the process illustrated in FIG. 2, when the depth unit 120 again generates a depth map 410 of the target scene 300 according to the capture result provided by the image capture apparatus 110, the processing unit 130 may directly determine the effective operating area 350 in the depth map 410 according to the information previously obtained when searching for the effective operating area, and only the action within the effective operating area 350 is to be considered as an operation on the electronic apparatus. Furthermore, the processing unit 130 makes the effective operating area 350 and a display screen 420 of the electronic apparatus corresponding to each other. Thus, when the user 320 moves his or her right hand 32 to the upper left corner of the effective operating area 350, a pointer 430 on the display screen 420 also moves correspondingly to the upper left corner of the display screen 420 so that the user 320 can perform various operations on the electronic apparatus, such as selecting an item in a menu.

Based on the above, in the operating area determination system and method of the present invention, after the depth maps of the target scene are generated, the reference point and the standard point are found according to the motion feature. Further, the effective operating area is determined according to the reference point and the standard point. Thus, even though there are several users appearing in the target scene, the operator who actually performs the operation may be effectively identified from all the users by the present invention, and the effective operating area is locked at the position where the operator is located. Afterward, only the effective operating area is required for analyzing and tracking the operator's action so that the system computing complexity is reduced, and the operation efficiency is improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An operating area determination method, comprising:
capturing at least one image of a target scene at a plurality of time points by at least one image capture device;
generating a depth map of the target scene corresponding to each of the time points according to the at least one image;
comparing a difference between at least two specific depth maps among the depth maps to identify a moving object in the at least one image and defining a position of the moving object in the at least one image as a reference point;
obtaining one of the at least two specific depth maps;
searching outward for a user's face in the obtained specific depth map using the reference point as a center, wherein a difference between a depth corresponding to the user's face and the specific depth corresponding to the reference point has not exceeded a preset value;
defining a position of the user's face in the at least one image as a standard point; and
determining an effective operating area for controlling an electronic apparatus in the target scene according to the reference point and the standard point defined in the at least one image.

2. The operating area determination method according to claim 1, wherein the step of generating the depth map of the target scene corresponding to each of the time points according to the at least one image comprises:
analyzing a distance between at least one object in the at least one image and an observing position respectively to generate the depth map of the target scene at each of the time points.

3. The operating area determination method according to claim 1, wherein the step of comparing the difference between the at least two specific depth maps among the depth maps to identify the moving object in the at least one image comprises:
performing a detection of a motion feature on the at least two specific depth maps to identify the moving object which moves and matches a predetermined operation object type.

4. The operating area determination method according to claim 3, wherein the operation object type comprises a user's hand, a remote controller and a baton.

5. The operating area determination method according to claim 1,
wherein the step of searching outward for the user's face in the obtained specific depth map using the reference point as the center comprises:
searching for the user's face toward a specific direction using the reference point as the center.

6. The operating area determination method according to claim 1, wherein after the effective operating area is determined according to the reference point and the standard point defined in the at least one image, the method further comprises:

corresponding the effective operating area with a display screen of the electronic apparatus.

7. An operating area determination system, comprising:
at least one image capture device, capturing at least one image of a target scene at a plurality of time points;
a processor, coupled to the at least one image capture device, generating a depth map of the target scene corresponding to each of the time points according to the at least one image provided by the at least one image capture device,
comparing a difference between at least two specific depth maps among the depth maps to identify a moving object in the at least one image, defining a position of the moving object in the at least one image as a reference point, obtaining one of the at least two specific depth maps, searching outward for a user's face in the obtained specific depth map using the reference point as a center, defining a position of the user's face in the at least one image as a standard point, and determining an effective operating area for controlling an electronic apparatus in the target scene according to the reference point and the standard point defined in the at least one image, wherein a difference between a depth corresponding to the standard point and the specific depth corresponding to the reference point has not exceeded a preset value.

8. The operating area determination system according to claim 7, wherein at each time point, the processor analyzes a distance between at least one object in the at least one image and an observing position respectively to generate the depth map of the target scene at the time point.

9. The operating area determination system according to claim 7, wherein the processor performs a detection of a motion feature on the at least two specific depth maps to identify the moving object which moves and matches a predetermined operation object type.

10. The operating area determination system according to claim 9, wherein the operation object type comprises a user's hand, a remote controller and a baton.

11. The operating area determination system according to claim 7, wherein the processor searches for the user's face toward a specific direction using the reference point as the center.

12. The operating area determination system according to claim 7, wherein the processor corresponds the effective operating area with a display screen of the electronic apparatus.

* * * * *